US011707059B2

(12) United States Patent
Bittner

(10) Patent No.: US 11,707,059 B2
(45) Date of Patent: Jul. 25, 2023

(54) TREE STAND AND METHOD OF USE THEREOF

(71) Applicant: Doran Ray Bittner, Paris, MI (US)

(72) Inventor: Doran Ray Bittner, Paris, MI (US)

(*) Notice: Subject to any disclaimer, the term of this patent is extended or adjusted under 35 U.S.C. 154(b) by 681 days.

(21) Appl. No.: 16/740,457

(22) Filed: Jan. 12, 2020

(65) Prior Publication Data
US 2020/0146278 A1  May 14, 2020

Related U.S. Application Data

(63) Continuation-in-part of application No. 16/602,015, filed on Jul. 19, 2019, now abandoned, which is a continuation-in-part of application No. 15/932,738, filed on Apr. 17, 2018, now abandoned.

(60) Provisional application No. 62/602,230, filed on Apr. 17, 2017.

(51) Int. Cl.
A01M 31/02    (2006.01)

(52) U.S. Cl.
CPC ..................... A01M 31/02 (2013.01)

(58) Field of Classification Search
CPC ................. A01M 31/02; E06C 1/39
See application file for complete search history.

(56) References Cited

U.S. PATENT DOCUMENTS

| 3,057,431 | A | * | 10/1962 | James | E06C 1/34 182/163 |
|---|---|---|---|---|---|
| 4,246,981 | A | * | 1/1981 | Stavenau | E04H 1/1205 182/116 |
| 4,331,217 | A | * | 5/1982 | Stecklow | E06C 7/16 248/238 |
| 4,552,247 | A | * | 11/1985 | Purdy | A01M 31/02 182/178.3 |
| 4,579,198 | A | * | 4/1986 | Lee | E04H 15/001 182/115 |
| 4,742,888 | A | * | 5/1988 | Amacker | A45F 3/26 182/163 |
| 5,253,732 | A | * | 10/1993 | Daniels | E06C 1/393 182/20 |
| 5,267,632 | A | * | 12/1993 | Mintz | A01M 31/02 182/163 |
| 5,279,390 | A | * | 1/1994 | Phillips | E06C 1/381 182/187 |
| 5,332,063 | A | * | 7/1994 | Amacker | A45F 3/26 182/187 |
| 5,368,127 | A | * | 11/1994 | Phillips | E06C 1/381 182/100 |
| 5,538,101 | A | * | 7/1996 | Kempf | A45F 3/26 182/187 |
| 5,791,436 | A | * | 8/1998 | Talley, Sr. | E06C 1/34 182/187 |
| 7,021,423 | B1 | * | 4/2006 | Pestrue | E06C 1/39 182/187 |
| 8,991,555 | B2 | * | 3/2015 | Furseth | E06C 7/48 182/187 |

(Continued)

Primary Examiner — Jerry E Redman
(74) Attorney, Agent, or Firm — Technology Law, PLLC

(57) ABSTRACT

A tree stand includes a ladder portion having first and second rails, a tree-engaging member configured to engage a tree, and a mechanism being selectively variable in length operatively interconnecting the member and the first and second rails and controlling the distance between the member and the first and second rails. A platform is pivotably connected to the first and second rails.

4 Claims, 5 Drawing Sheets

(56) References Cited

U.S. PATENT DOCUMENTS

| | | | | |
|---|---|---|---|---|
| 8,997,933 B2* | 4/2015 | Furseth | ................ | A01M 31/02 |
| | | | | 264/630 |
| 9,091,120 B2* | 7/2015 | Gabriel | ................ | E06C 7/165 |
| 2008/0128204 A1* | 6/2008 | Engstrom | ............ | A01M 31/02 |
| | | | | 182/187 |
| 2009/0229916 A1* | 9/2009 | Berkbuegler | ......... | A01M 31/02 |
| | | | | 182/132 |
| 2009/0229917 A1* | 9/2009 | Berkbuegler | ......... | A01M 31/02 |
| | | | | 182/187 |
| 2018/0228143 A1* | 8/2018 | Berkbuegler | ......... | A01M 31/02 |
| 2019/0343109 A1* | 11/2019 | Bittner | ................ | A01M 31/02 |
| 2020/0146278 A1* | 5/2020 | Bittner | ................ | A01M 31/02 |

* cited by examiner

TREE STAND AND METHOD OF USE THEREOF

CROSS-REFERENCE TO RELATED APPLICATION

This application is a continuation-in-part of U.S. patent application Ser. No. 16/602,015, filed Jul. 19, 2019, which is a continuation-in-part of U.S. patent application Ser. No. 15/932,738 filed Apr. 17, 2018, which claims the benefit of U.S. Provisional Patent Application Ser. No. 62/602,230 filed Apr. 17, 2017; each of the aforementioned applications being incorporated by reference in their entireties.

TECHNICAL FIELD

This disclosure relates to tree stands used by hunters.

BACKGROUND

Typically, the installation of a tree stand requires at least two people and is often frustrated by overhanging branches. In addition, the platform of most ladder tree stands gets in the way of attaching the upper end of the stand to a tree and can even cause the hunter to lose his balance and risk falling from the tree.

SUMMARY

A tree stand includes a ladder portion having first and second rails, a tree-engaging member configured to engage a tree, and a mechanism being selectively variable in length operatively interconnecting the member and the first and second rails and controlling the distance between the member and the first and second rails. A platform is pivotably connected to the first and second rails.

The tree stand provided herein improves upon the prior art by facilitating the installation of the tree stand and reducing the risk of injury during installation and use. More specifically, the mechanism controls the distance between the point at which the stand contacts a tree and the ladder, which permits the tree stand to be climbed and attached to the tree with the platform folded, thereby allowing the upper end of the ladder to be placed closer to the tree and improving the stability of the ladder and tree stand. After the tree stand is securely attached to the tree, the mechanism allows the ladder to be moved away from the tree, thereby providing adequate space for the platform to be positioned between the ladder and the tree.

In comparison, some prior art tree stands require that the ladder be displaced further from the tree to accommodate the horizontal platform, which must be placed in its horizontal position prior to installation on the tree, thereby inducing instability while climbing the ladder. The tree stand provided herein also improves upon prior art tree stands in which the platform extends from the ladder away from the tree, thereby blocking the climbing path of the user up the ladder.

A corresponding method of use is also provided.

The above features and advantages and other features and advantages of the present disclosure are readily apparent from the following detailed description of the best modes for carrying out the disclosure when taken in connection with the accompanying drawings

DESCRIPTION OF THE PREFERRED EMBODIMENTS

Figure 1:
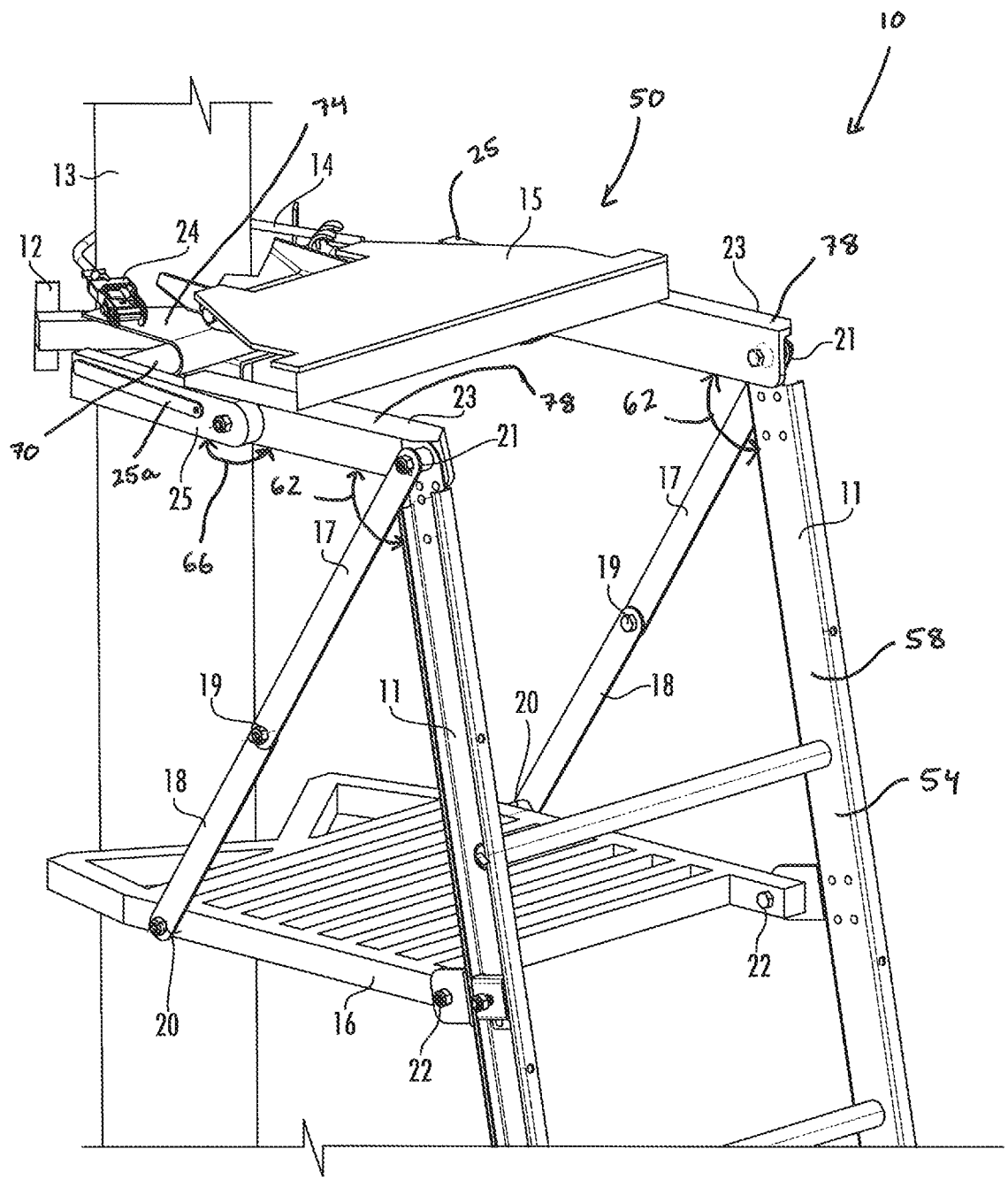
FIG. 1 is a perspective view of the upper end of a highly preferred embodiment of the instant invention strapped to a tree and with the seat and foot platform unfolded.

Referring now to FIG. 1, therein is shown a perspective view of the upper end of an extended highly preferred embodiment of a tree stand 10 strapped to tree 13 by strap 14. A folding frame assembly 50 comprised of tree grasping fork 12 and folding links 23 and 25 is pivotally attached to the upper end of rails 11 of the upper section of an extension ladder 54 by bolts 21. Seat 15 is pivotally attached to the folding frame member by hinge 15a. Foot platform 16 is pivotally attached to the rails 11 of the upper section of the extension ladder by bolts 22. A folding support strut comprised of links 17 and 18 is attached at one end thereof to foot platform 16 by bolts 20 and at the other end thereof to the upper end of rails 11 by bolts 21. Ratchet 24 is provided at the end of strap 14 and is bolted to the fork 12 and bracket 74. Ratchet 24 selectively tightens the strap 14 around the tree 13, as understood by those skilled in the art.

Figure 2:
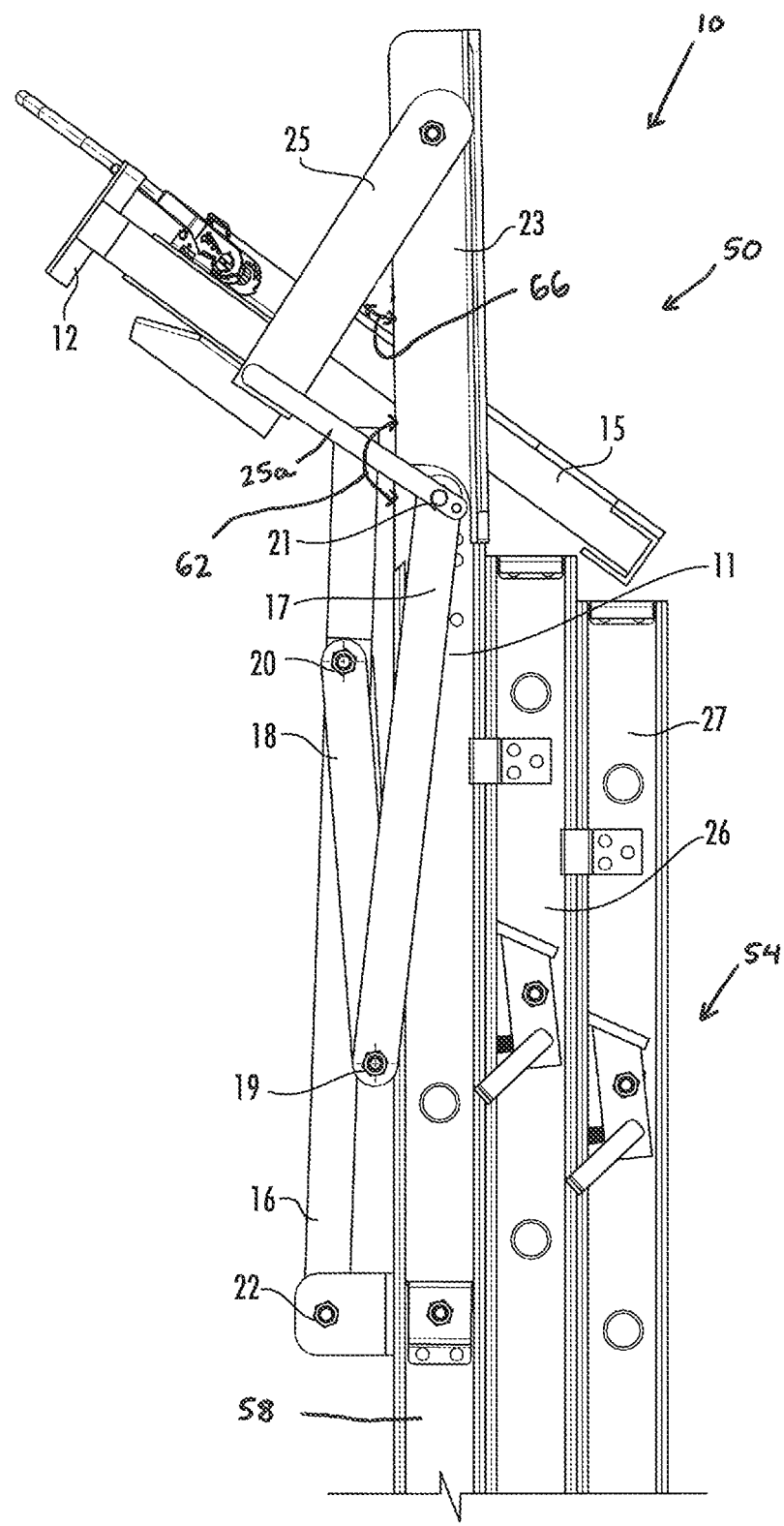
FIG. 2 is a side view of the upper end of an unextended highly preferred embodiment of the instant invention with the seat and foot platform folded.
Figure 3:
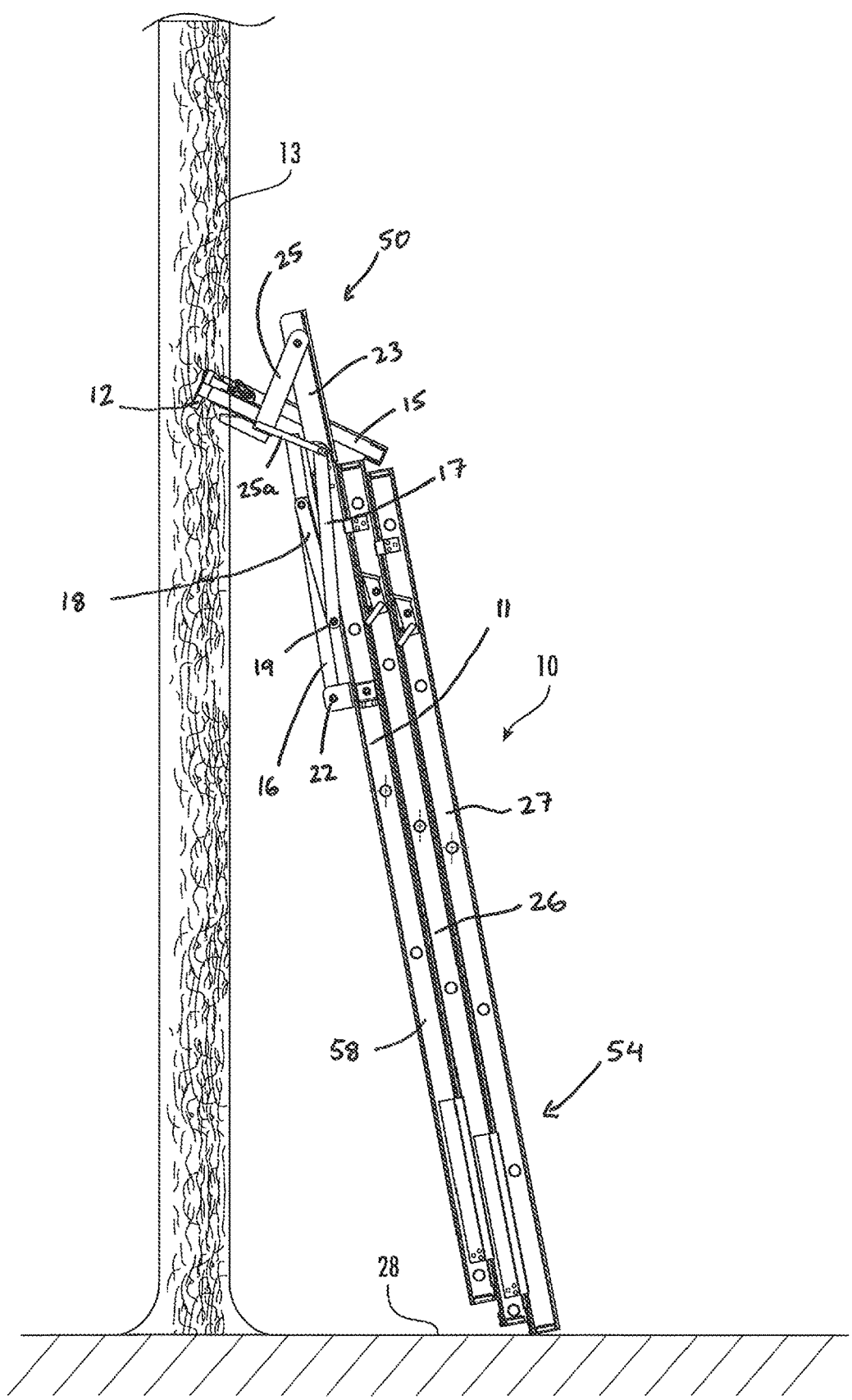
FIG. 3 is a side view of an unextended highly preferred embodiment of the instant invention resting on a tree with the seat and foot platform folded.
Figure 4:
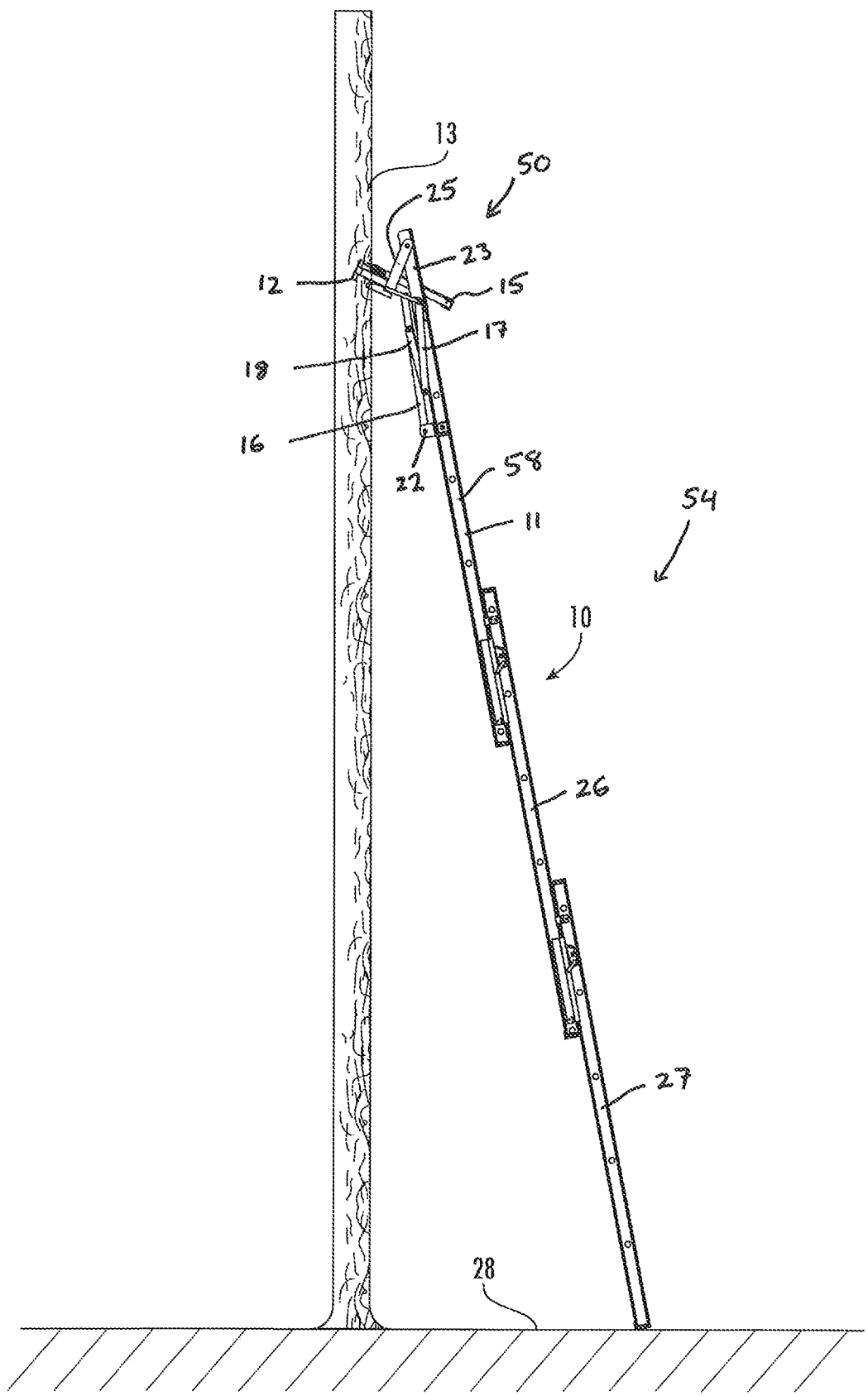
FIG. 4 is a side view of an extended highly preferred embodiment of the instant invention resting on a tree with the seat and foot platform folded.

Referring now to FIG. 2, therein is shown a side view of embodiment 10 shown in FIG. 1 with the folding frame member 50 and foot platform 16 in their folded positions assisted by rubber retaining strap 25a attached to bolt 21 and link 25. The extension ladder 54 shown in FIG. 2 is a triple extension ladder comprised of sections 58, 26 and 27 that are slidable or otherwise movable with respect to each other in order to selectively change the height of the ladder 54, as understood by those skilled in the art. Referring now to FIG. 3, therein is shown embodiment 10 of FIG. 2 on ground 28 leaning against tree 13. Referring now to FIG. 4, therein is shown embodiment 10 of FIG. 3 on ground 28 leaning against tree 13 with the extension ladder in its extended position. A user of embodiment 10 can climb the extension ladder, pivot the seat up so that strap 14 can be attached to tree 13 and then unfold the folding frame member and foot platform as shown in FIG. 5.

Referring again to FIGS. 1 and 2, the two links 23 are first and second members that are pivotably connected to first and second rails 11 of the ladder. One of the links 25 is a third member pivotably connected to the first member (i.e., one of the links 23), and the other of the links 25 is a fourth member pivotably connected to the second member (i.e., the other of the links 23). The grasping fork 12 is a fifth member pivotably connected to the third and fourth members (i.e., links 25). The platform 16 is pivotably connected to the rails 11. The pivot axis of the platform 16 with respect to the rails 11 is below the pivot axis of the links 25.

Figure 5:
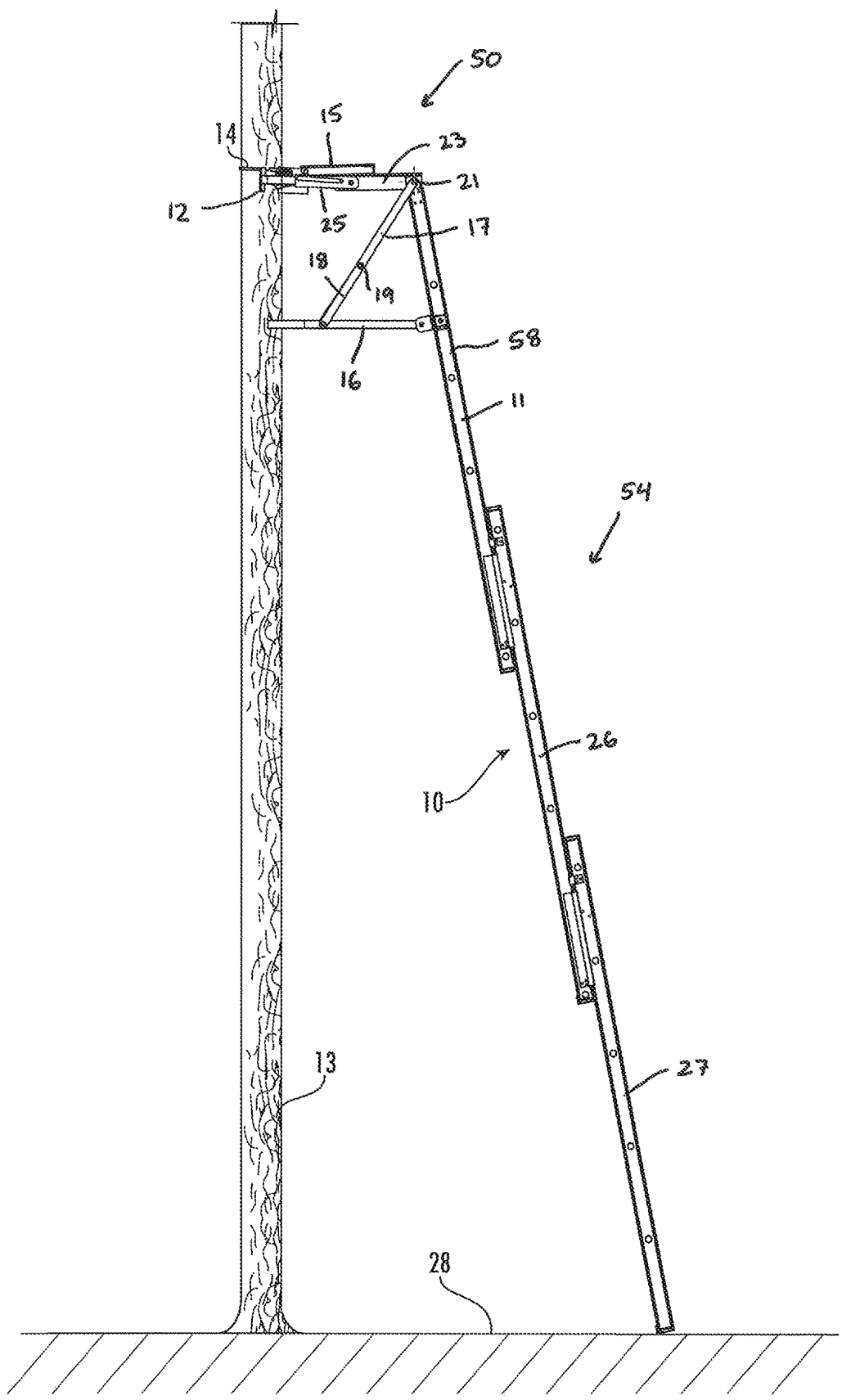
FIG. 5 is a side view of an extended highly preferred embodiment of the instant invention strapped to a tree with the seat and foot platforms unfolded

When the folding frame assembly 50 is in its folded configuration, as shown in FIGS. 2-4, the distance between the fork 12 and the ladder rails 11 is reduced or minimized compared to the distance between the fork 12 and the ladder rails 11 when the frame assembly 50 is in its unfolded configuration, as shown in FIGS. 1 and 5. More specifically, and with reference to FIG. 2, when the frame assembly 50 is in its folded configuration, links 23 and the rails 11 form an angle 62 therebetween of approximately 180 degrees, and links 23 and links 25 form an angle 66 therebetween that is less than 90 degrees and, more preferably, less than 45 degrees. Referring to FIG. 1, when the frame assembly 50 is in its unfolded configuration, angle 62 is approximately 90 degrees and angle 66 is approximately 180 degrees. Accordingly, the folding frame assembly 50 is a mechanism interconnecting, and controlling the distance between, the fork 12 and the ladder 54.

A cylindrical member 70 extends between, and interconnects, the two links 25. A U-shaped bracket 74 is connected to the fork 12. The cylindrical member 70 extends through the cavity formed by the bracket 74 such that the bracket 74 and the fork 12 are rotatable or pivotable with respect to the links 25. The seat 15 is pivotably connected to the bracket 74 by hinge 15a. The links 23 are characterized by flanges 78 that are positioned to contact links 25 when angle 66 is approximately 180 degrees, and thereby prevent angle 66 from becoming larger than approximately 180 degrees.

The platform 16 is pivotable with respect to the ladder rails 11 between a folded position, as shown in FIGS. 2-4, and an unfolded position, as shown in FIGS. 1 and 5. In the folded position, the platform 16 is substantially parallel to the rails 11, and in the unfolded position, the platform 16 is almost perpendicular to the rails 11. Thus, when the rails 11 are almost vertical, as in use against a tree, the platform 16 is substantially horizontal in its unfolded position.

A method of using the tree stand is shown in FIGS. 3-5. The method includes positioning the tree stand 10 such that the ladder 54 contacts the ground and the fifth member, i.e., the grasping fork 12, contacts a tree 13 with the folding frame assembly 50 in its folded configuration and the platform 16 in its folded position, as shown in FIG. 3. The method may also include extending the ladder 54 to extend its length, as shown in FIG. 4. The method includes securing the fifth member, i.e., grasping fork 12, to the tree 13 with the strap 14. As seen in FIG. 4, the seat 15 may interfere with easy access to the strap 14 and tree 13 for someone on the ladder 54. The seat 15 is pivotable with respect to the folding frame assembly 50, so the method may also include pivoting the seat 15 to a more vertical orientation to better access the strap 14 and the tree 13. The method may also include detaching the retaining strap 25a from bolt 21 to permit free movement of the frame assembly 50 and the platform 16.

The method further includes, after securing the fifth member 12 to the tree 13 with strap 14, causing the first and second members 23 to pivot relative to the first and second rails 11, and causing the third and fourth members 25 to pivot relative to the first and second members 23 until the members 23, 25, 12 are aligned with each other and substantially horizontal, as shown in FIG. 5. In other words, the method includes causing the folding frame assembly 50 to move from its folded configuration to its unfolded configuration. This may be accomplished by moving the top end of the tree stand assembly 10 and ladder 54 away from the tree 13, such as by pushing on the tree 13 with one hand while holding the upper end of the ladder with the other, thereby exerting a force on the upper end of the tree stand assembly 10 away from the tree. This force may also be generated by the user shifting his or her weight away from the tree while standing on the ladder 54 near the top. Movement of the ladder away from the tree may be rotation of the ladder at or near its base, or may be movement of the entire ladder.

The platform 16 is in its folded position throughout the previous method steps. However, with the folding frame assembly 50 in its unfolded configuration and the ladder 54 further from the tree 13, there is sufficient space between the tree 13 and the ladder 54 for the platform 16 to extend horizontally therebetween. Accordingly, the method also includes moving the platform 16 from its folded position to its unfolded position, after causing the folding frame assembly 50 to move from its folded configuration to its unfolded configuration. A user may then climb onto the platform 16, which supports his or her feet, and then sit on the seat 15, which is horizontally oriented.

The components of the instant invention can be made of any suitable material but preferably are primarily made of extruded aluminum. The tree stand of the instant invention can be erected by one person. Since the tree stand of the instant invention can comprise an extension ladder the tree stand of the instant invention can be erected even when overhanging branches would obstruct the installation of the conventional ladder tree stand. The fact that the upper end of the tree stand of the instant invention can be secured to a tree before the seat and foot platform are unfolded provides a significant safety advantage over tree stands having fixed seats and foot platforms. The tree stand of the instant invention can utilize a single ladder section or an extension ladder having two or more ladder sections. The embodiment shown in FIG. 1 shows the instant invention with a single ladder section. It should be noted that, within the scope of the claimed invention, the first and second members may or may not be connected to each other, and may or may not be portions of a single unitary piece. Similarly, the third and fourth members may or may not be connected to each other, and may or may not be portions of a single unitary piece.

While the best modes for carrying out the invention have been described in detail, those familiar with the art to which this invention relates will recognize various alternative designs and embodiments for practicing the invention within the scope of the appended claims.

The invention claimed is:

1. A method comprising:
   obtaining a tree stand assembly;
   said tree stand assembly including a ladder portion having first and second rails, a first member pivotably connected to the first rail, a second member pivotably connected to the second rail, a third member pivotably connected to the first member, a fourth member pivotably connected to the second member; a fifth member pivotably connected to the third and fourth members; and a platform pivotably connected to the first and second rails;
   placing the fifth member against a tree;
   securing the tree stand to the tree with a strap;
   with the tree stand secured to the tree with the strap, causing the top end of the ladder portion to move away from the tree, the first and second members to pivot relative to the first and second rails, and the third and fourth members to pivot relative to the first and second members;
   wherein said causing the top end of the ladder portion to move away from the tree causes the first member to be substantially parallel to the third member, and the second member to be substantially parallel to the fourth member; and
   wherein said causing the top end of the ladder portion to move away from the tree causes the first member, second member, third member, and fourth member to be substantially horizontal.

2. The method of claim 1, further comprising pivoting the platform with respect to the ladder portion until the platform is substantially horizontal.

3. The method of claim 2, wherein the tree stand assembly includes a seat that is pivotably connected to the third and fourth members; and
- wherein the method further includes pivoting the seat relative to the third and fourth members prior to said securing the tree stand to the tree with a strap.

4. A method comprising:
obtaining a tree stand assembly;
said tree stand assembly including a ladder portion having first and second rails, a first member pivotably connected to the first rail, a second member pivotably connected to the second rail, a third member pivotably connected to the first member, a fourth member pivotably connected to the second member; a fifth member pivotably connected to the third and fourth members; and a platform pivotably connected to the first and second rails;
placing the fifth member against a tree;
securing the tree stand to the tree;
with the tree stand secured to the tree, causing the top end of the ladder portion to move away from the tree, thereby causing the first and second members to pivot relative to the first and second rails, and the third and fourth members to pivot relative to the first and second members such that the first, second, third, and fourth members are substantially horizontal.

\* \* \* \* \*